Jan. 14, 1969  W. K. LUSE ET AL  3,421,360
PIPELINE METER PROVER
Filed Sept. 12, 1966
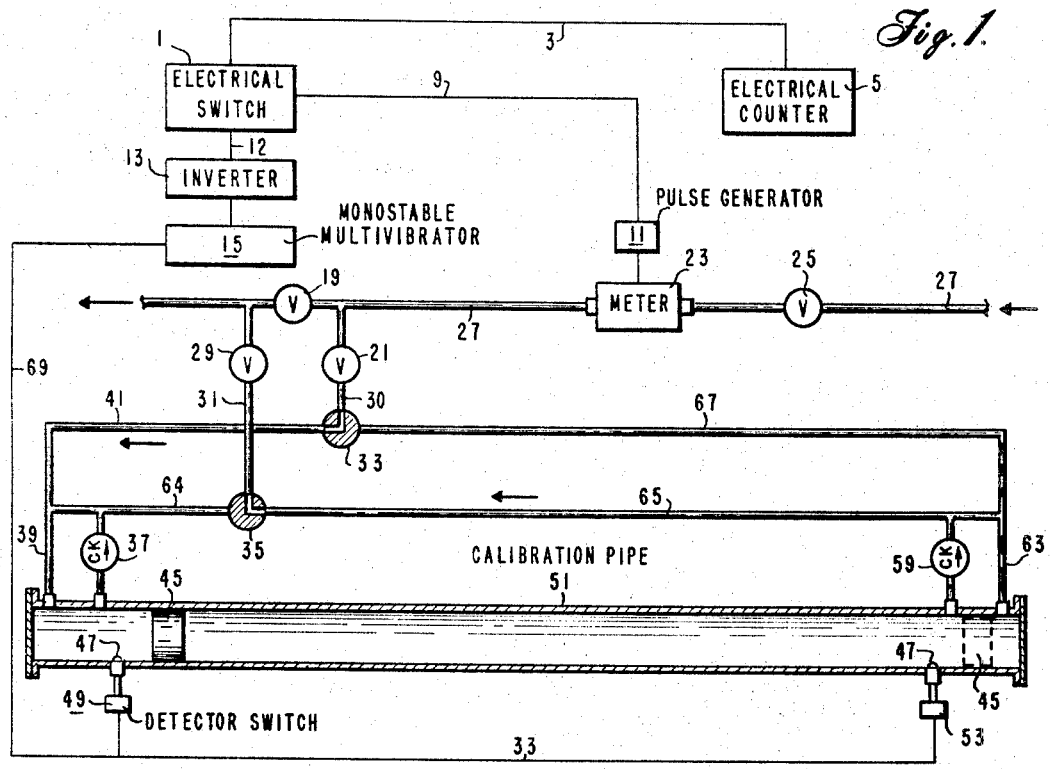
Fig. 1.
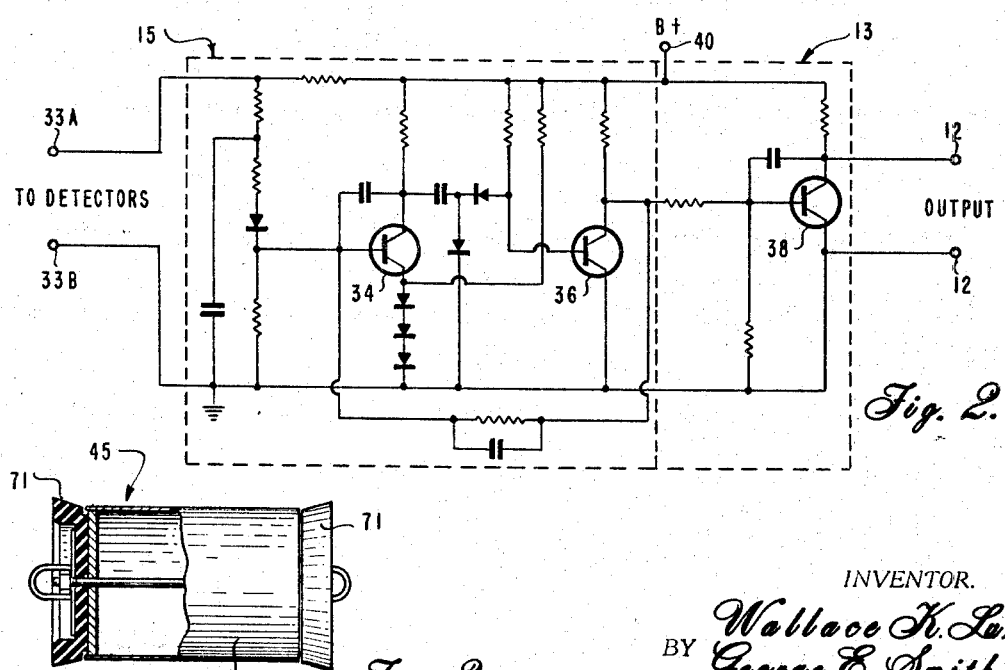
Fig. 2.
Fig. 3.
INVENTOR.
Wallace K. Luse
BY George E. Smith,
John B Davidson
ATTORNEY.

United States Patent Office 3,421,360
Patented Jan. 14, 1969

3,421,360
PIPELINE METER PROVER
Wallace K. Luse and George E. Smith, Houston, Tex., assignors to Esso Research and Engineering Company
Filed Sept. 12, 1966, Ser. No. 578,666
U.S. Cl. 73—3                    1 Claim
Int. Cl. G01f 25/00

ABSTRACT OF THE DISCLOSURE

The accuracy of a bi-directional meter prover is increased by providing detection means which are actuated by detecting passage of the leading and trailing edges of the bi-directional piston and by providing particular circuitry for closing a switch on passage of the leading edge of the piston and opening same on passage of the trailing edge; improved results are also obtained by locating the piston detection means substantially opposite and under first and second check valve means on the calibration barrel which allows use of substantially the total length of the barrel in proving the meter.

---

This invention is directed to pipeline meter provers, and more particularly to the type of meter prover for calibrating a meter in a pipeline under operating conditions while maintaining the meter on stream in the pipeline.

A particularly satisfactory type of pipeline meter prover is that described in U.S. Patent 3,021,703, Pfrehm. The meter is adapted to be fluidly connected in series with a calibration pipe or barrel. A pulse generator is operatively connected to the meter to produce pulses at intervals proportional to flow through the meter of a given quantity of fluid. A free piston moves through the calibration pipe or barrel under the impetus of the fluid pressure. Switches near each end of the barrel produce pulses responsive to movement therepast of the piston. The pulse generator and the switches are connected to an electronic switching means that connects the pulse generator to a pulse counter during the interval between successive pulses from the switching means as the piston moves through the calibration pipe or barrel. Thus, the number of pulses produced by the meter as the piston moves from one switch to another is indicative of a given quantity of fluid that passes both through the meter and the barrel and which can be very precisely determined.

The present invention is primarily directed to improving the accuracy of the meter prover described above. In the above-described meter prover it was necessary to trigger the electronic switch by pulses produced by the leading edge of the traveling piston. As a result of switch contact bounce of the limit switches connected to the calibration pipe, the electronic switch could be erroneously switched on and off by the same limit switch. Furthermore, on provers using a cylindrical displacer, the primary sealing device is necessarily attached to the trailing edge of the displacer. Particularly in a bidirectional mechanical displacement meter prover this can result in measurement errors. Furthermore, it is desirable to have the over-all length of the calibration barrel as short as possible for a usable length of the calibrated section thereof. Of necessity, in the apparatus described above, the distance between the outlet port and the detector switch had to be appreciable, thus increasing the over-all length of the prover.

Objects and features of the invention not apparent from the above discussion will become evident upon consideration of the following detailed description thereof when taken in connection with the accompanying drawings, wherein:

FIG. 1 is a schematic diagram of a meter prover used in accordance with the invention;
FIG. 2 is an electrical schematic diagram of the monostable multivibrator and the amplitude-inverter illustrated in FIG. 1; and
FIG. 3 is a side view, partially in section, of the free piston 23 of FIG. 1 illustrating certain constructional details thereof.

Briefly described, the invention utilizes a pulse generator for producing output pulses at intervals indicative of the passage through the meter of a given volume of fluid, a calibration pipe or barrel adapted to be connected in fluid series relationship with the meter, detector switches near the input and output of the calibration pipe, and a free piston to be detected, the position of which is detected by the detector switch. An electrical switch is provided as in the prior art for gating the output pulses of the pulse generator to an electronic counter responsive to successive electrical signals fed thereto. Connected to the switches and the detector switch and responsive to passage of the trailing edge of the free piston is a monostable multivibrator adapted to produce an output pulse upon opening of the detector switch. The output pulse is connected to the electrical switch so that pulses from the pulse generator will be gated through the electrical switch responsive to a signal produced by the monostable multivibrator upon opening of one of the detector switches, and pulses from the pulse generator will be cut off responsive to opening of the other detector switch when the piston passes the switch.

With reference now to FIG. 1, there is illustrated a pipeline 27, a meter 23 for measuring the volume of fluid passing through the pipeline, a valve 25 connected in the pipeline on one side of the meter, and valve 19 connected in the pipeline on the other side of the meter. An elongated calibration pipe or barrel 51 is connected to the line 27 between the valve 19 and meter 23 by means of line 30 and three-way valve 33. In one position of the three-way valve 33 a portion of line 27 between valve 19 and meter 23 is connected to the left end, as viewed, of the calibration pipe 51 through pipe 41 and parallel connected check valve 37 and pipe section 39. The connection in the other position of the three-way valve is to the right end of the calibration pipe 51, as viewed, through pipe sections 67 and parallel connected check valve 59 and pipe section 63. The portion of the pipeline 27 on the opposite side of valve 19 is connected to the left end of the calibration pipe through three-way valve 35 in one position thereof and through pipe section 64, check valve 37, and pipe section 39. The connection to the right end of pipe 51 is made through line 31, three-way valve 35 (in its other position), pipe section 65, and parallel connected check valve 59 and pipe section 63. The distance between the connections to the calibration pipe 51 of pipe section 39 and check valve 37, and between check valve 59 and pipe section 63 is greater than the length of free piston 45, for reasons that will become apparent below. Valves 21 and 29 are positioned in lines 30 and 31, respectively, to isolate the calibration pipe when desired. Piston detector switches 49 and 53 are positioned on the calibration pipe 51 near opposite ends thereof immediately below the connections to pipe 51 of check valves 37 and 59 and very slightly toward the center of pipe 51 away from said connections. Detector switches 49 and 53 may be of the mechanical type described in Patent 3,021,703, of the magnetic proximity type marketed by Honeywell, Inc. of Minneapolis, Minn., as well as other types well known to the art. A characteristic of all of these suitable detector switches is that the switch closes as the leading edge of the piston 45 passes thereover and opens as the trailing edge of the piston passes thereover. The mechanical type of detector switch described in the aforementioned Patent 3,021,703 has an actuating ball 47 protruding into the calibration pipe a very short distance which is adapted to be forced out of the interior of the pipe so as to close a switch connected thereto.

The meter 23, the accuracy of which is to be measured, is connected to a pulse generator 11 which is adapted to produce pulses responsive to passage through the meter of a predetermined quantity of fluid. A suitable pulse generator for this purpose is described in Beckman Instruments, Inc. Catalog 705 (1957), and is electrically connected to the meter 23 which is of the positive displacement type. The output signal of the pulse generator 11 is connected to an electrical switch 1 through leads 9, which in turn are connected by leads 3 to an electrical counter 5 which may be of a type well known to the art, such as is described in the aforementioned Beckman Instruments Catalog 705. The electrical switch 1 may be of the type described in the aforementioned patent comprising a bi-stable multivibrator adapted to switch between stable states responsive to successive electrical pulses applied to a control circuit thereof from leads 12. The output of the multivibrator is connected to a transistor switch which short-circuits the output of an amplifier when the bi-stable multivibrator is in one of its stable states. When the switch does not short-circuit the amplifier, the amplifier connects leads 9 to leads 3 and electrical counter 5 to pass pulses from the pulse generator to the electrical counter. Other types of gates or electrical switches for accomplishing the same purpose are well known to the art and likewise may be used in connection with the invention.

The detector switches 49 and 53 are connected to electrical switch 1 through a monostable multivibrator 15 and inverter 13. The inverter 13 is connected to switch 1 through leads 12 so that successive output pulses from multivibrator 15 actuate the electrical switch 1 to successively open and close the switch. The circuit details of the multivibrator 15 and inverter 13 are illustrated in FIG. 2. The multivibrator is of the type well known to the art utitlizing NPN-type transistors 34 and 36 connected in a conventional manner such that short-circuiting of terminals 33A and 33B or leads 33 will produce no response in the multivibrator, but opening the short-circuit will cause the conductive state of transistor 34 to transfer to transistor 36 and back again to transistor 34 so as to produce an output pulse in the base circuit of transistor 38. The function of transistor 38 is only to invert the polarity of the output pulse appearing across output leads 12. The transistors may be of the type 2N706A and the diodes illustrated may be of the type 1N461. A positive voltage of up to 150 volts is applied to terminal 40 for energizing the circuit.

The constructional details of a suitable piston 45 are illustrated in FIG. 3. This particular piston is suitable for actuating the mechanical type detector switch illustrated in FIG. 1. As illustrated, the piston comprises a cylindrical body member 76 having annular rubber cups 71 affixed thereto at each end thereof. One of the cups at the trailing edge of the piston seals against the interior of pipe 51 when fluid differential pressure exists across the piston. Other types of pistons well known to the art may be utilized.

The over-all operation of the apparatus described above is as follows. Assume that the piston 45 is initially positioned between the connections to calibration pipe 51 of pipe section 39 and check valve 37. Assume also that valves 19 and 25 are open and that valves 33 and 35 are in positions illustrated in FIG. 1. When it is desired to begin a calibration run of meter 23, valve 19 is closed so that hydraulic pressure is applied across piston 45 to move the piston to the right. As piston 45 moves across the detector switch 47, terminals 33A and 33B and lead 69 will first be short-circuited and then be opened as the trailing edge of the piston 45 releases the contacts of switch 49. At this instant a pulse will be produced by multivibrator 15 which will be applied to the electrical switch through inverter 13 so that pulses being produced by the pulse generator 11 will pass through the switch to counter 5 and be counted by the counter. When the leading edge of the piston strikes the ball 47 of switch 53, terminals 33A and 33B will be short-circuited. As soon as the short-circuit is removed by passage of the trailing edge of the piston past the ball member 47, a second pulse will be produced by multivibrator 15 which will be applied through inverter 13 to the switch 1 to close the switch so that pulses from pulse generator 11 no longer are counted by counter 5. Thus, the volume of fluid required to push the trailing edge of the piston 45 from switch 49 to switch 53 is known and can be compared with the volume indicated by meter 23 as indicated by the electrical counter 5. This is done by multiplying the volume passing through the meter 23 required to produce one pulse by the number of pulses counted by the counter 5. As soon as the trailing edge of the piston 45 passes the connection to the pipe 51 of check valve 59, the piston will stop since liquid will now flow through the check valve 59 rather than through pipe section 63. If it is desired to make another calibration run, the three-way valves 33 and 35 are moved to their other positions so that liquid flows through valves 21 and 33, pipe sections 67 and 63, calibration pipe 51, pipe sections 39 and 64, and valves 35 and 29 and back to the pipeline 27. This will move the piston 45 to the left, as viewed, resulting in pulses being produced by the multivibrator 15 when the piston 45 passes over the switches 53 and 49 to respectively open and close switch 1 to gate pulses from pulse generator 11 to counter 5. Inasmuch as the trailing edge of the piston 45 actuates the detector switches 49 and 53, the detector switches can be positioned almost under the connections of check valve 37 and 59 to calibration pipe 51, as illustrated in the drawing. Thus, a greater length of the calibration pipe 51 is usable in making a calibration of the meter 23.

The invention is not to be restricted to the specific structural details, arrangement of parts, or circuit connections herein set forth, as various modifications thereof may be effected without departing from the spirit and scope of this invention.

What is claimed is:

1. In a meter prover for calibrating a meter in a pipeline including a calibration barrel for connection in the pipeline, pulse generating means operatively connected to the meter for generating pulses responsive to fluid flow through the meter, pulse counter means, control means operatively connected to said pulse generating means and to said pulse counter means for controlling the flow of pulses to said pulse counter means from said pulse generating means responsive to actuating signals applied thereto, piston means movably arranged in said barrel to form a seal with the wall of the barrel, the improvement comprising:

first and second piston detecting means operatively positioned on said calibration barrel for detecting the passage of the leading and trailing edges of said piston past spaced-apart locations near opposed ends of said barrel;

actuating signal generating means connected to said pulse counter means and to said piston detecting means for producing actuating signals for said control means responsive to indications produced by said piston detecting means upon passage of the trailing edge of said piston means past said spaced-apart locations on said barrel;

each of said piston detecting means comprising a switch adapted to be closed upon passage of the leading edge of said piston thereover and to be opened upon passage of said trailing edge of said piston thereover, and wherein said actuating signal generating means includes a monostable multivibrator responsive to opening of said switch means in said piston detecting means to produce an output pulse, and wherein said control means is responsive to successive output pulses from said monostable multivibrator to alternately permit the flow of and inhibit the flow of pulses from said pulses generating means to said counter means.

References Cited

UNITED STATES PATENTS

| | | | |
|---|---|---|---|
| 3,021,703 | 2/1962 | Pfrehm | 73—3 |
| 3,120,118 | 2/1964 | Boyle | 73—3 |

S. CLEMENT SWISHER, *Primary Examiner.*

D. M. YASICH, *Assistant Examiner.*